2,874,086
COMPOSITIONS AND METHODS OF COMBATING NEMATODES EMPLOYING HYDRAZINO-BIS-(DITHIOCARBONIC ACID-ESTERS)

Winfried Kruckenberg, Leverkusen, and Bernhard Homeyer, Koln-Stammheim, Germany, assignors to Farbenfabriken Bayer Aktiengesellschaft, Leverkusen, Germany, a corporation of Germany No Drawing. Application February 5, 1957
Serial No. 638,198

Claims priority, application Germany February 17, 1956

2 Claims. (Cl. 167—22)

This invention relates to compositions for the combating of nematodes, more specifically this invention relates to such compositions which contain as an active ingredient derivatives of hydrazino-bis-(dithiocarbonicacidesters) of the formula $$R^1-S-\underset{\underset{S}{\|}}{C}-NH-NH-\underset{\underset{S}{\|}}{C}-S-R^2$$

in which $R^1$ and $R^2$ stand for lower aliphatic radicals, which may either be saturated or unsaturated.

Esters of dithiocarbamic acids as well as esters of trithiocarbonic acid are known to exhibit nematicidal properties; if soil is treated with these compounds, a certain effect in killing nematodes is obtained. Gaseous nematicides of the class of halogenated lower aliphatic hydrocarbons, such as dichloropropane-dichloropropene (DD) are more effective but more difficult to handle. Intensive work has, therefore, been done to find more effective solid or liquid nematicides which may be incorporated into the soil by simpler methods.

In accordance with the present invention it has now been found that very effective nematicidal compositions may consist essentially of hydrazino-bis-(dithiocarbonicacidesters) of the above mentioned formula. More specifically, the radicals $R^1$ and $R^2$ in the above formula may be lower alkyl, such as methyl, ethyl, propyl, isopropyl, butyl, sec. butyl, isobutyl, amyl, isoamyl and the like or lower alkenyl such as vinyl, allyl, crotyl and the like. The nematicidal compositions may further contain suitable inert diluents or carriers e. g. solid carriers such as chalk, talc, bentonite, clay, etc. or liquid carriers such as water (if necessary with commercial emulsifiers) lower aliphatic alcohols such as methanol, ethanol, isopropanol, etc. Furthermore they may be added to fertilizers, other pesticides, fungicides and the like. The inventive compositions are relatively harmless to green plants especially if the soil is pretreated with their compositions some time (2 to 3 weeks) before the growing period.

The compositions according to the present invention may contain the essential active ingredient in amounts from about 0.01% to about 99%. Preferably solutions or extensions containing the active ingredient up to 10% are used in granulates. These may preferably be strewed on the surface of the soil. Following this application there is no need for complicated soil injection devices which are necessary, if solutions are used. Usually about 20 g. to about 250 g. of active ingredient hydrazino-bis-(dithiocarbonicacidethylester) should be used per cubic meter of soil, the necessary amount depending on the kind of nematodes and the amount of nematodes being present in the soil. In greenhouses (floriculture and horticulture) the necesary amount is usually a little less than in the field. Especially the cyst-forming root nematodes require higher concentrations and amounts of effective ingredients. The compositions of this invention are advantageously incorporated into the soil at least 3-4 weeks before the soil is sewed or planting is undertaken.

In the field the treatment preferably should be carried out in spring or fall, especially in the fall since during this time also vegetation pauses.

The inventive compositions may be used against a great variety of nematodes, thus, making these compositions generally applicable as effective nematicides. Without any restriction there may be named as examples of nematodes, which may effectively be attacked: *Heterodora schachtii, Aphelenchoides ritzemabosi,* Meloidogyne spec., *Ditylenchus diptaci* and the like. The active ingredients are generally known and may be prepared according to known methods; they are described in Arkiv Kemi 4, 297–323 (1952), (Chem. Abstr. 47 (1953), page 9271 ff.). The following examples may illustrate this invention.

EXAMPLE 1

The hydrazo-di-(dithiocarbonicacidethylester)

$$C_2H_5-S-\underset{\underset{S}{\|}}{C}-NH-NH-\underset{\underset{S}{\|}}{C}-S\,C_2H_5$$

has been used in laboratory and greenhouse tests against phytopathogenic nematodes.

(a) Laboratory tests

The following types of nematodes were placed in aqueous solutions containing a small amount of acetone as auxiliary solvent and 0.1% of a commercial benzyloxydiphenylpolyglycolether as emulsifier of concentrations indicated below and tested as to their state of life after 24 hours. The number of nematodes killed is given in percentages.

| Concentration, percent | Aphelenchoides ritzemalori, percent | Ditylenchus dipreci, percent | Meloidogyne spec., percent |
|---|---|---|---|
| 0.1 | 100 | 100 | 100 |
| 0.01 | 100 | 100 | 100 |
| 0.005 | 95 | 100 | 100 |
| 0.001 | 20 | 40 | 50 |

(b) Greenhouse tests

A spray of nematicides containing 10% of hydrazino-bis-(dithiocarbonicacidethylester) and 90% of a mixture of talc and clay (50:50) was mixed with soil, which was infested with nematodes of the group meloidogyne spec. Tomato plants were placed in the soil thus treated as hosts. The following figures indicate the amount of active ingredients necessary in the soil for the indicated percentage of killing the nematodes.

Quantity applied:                                         Effect, percent
   300 mg. active substance per kilogram soil__ 100
   200 mg. active substance per kilogram soil____ 100
   100 mg. active substance per kilogram soil____ 100
    50 mg. active substance per kilogram soil____ 80
    25 mg. active substance per kilogram soil____ 30

In the same way there are tested the following compounds the results being given in the following tables:

EXAMPLE 2

$$CH_3-S-\underset{\underset{S}{\|}}{C}-NH-NH-\underset{\underset{S}{\|}}{C}-S-CH_3$$

(a) Laboratory tests

| Concentration, percent | Aphelenchoides ritzemalori, percent | Ditylenchus dipreci, percent | Meloidogyne spec., percent |
|---|---|---|---|
| 0.1 | 100 | 100 | 100 |
| 0.01 | 100 | 100 | 100 |
| 0.005 | 100 | 80 | 70 |

(b) Greenhouse tests

Quantity applied: Effect, percent
- 300 mg. active substance per kilogram soil____ 100
- 200 mg. active substance per kilogram soil____ 100
- 100 mg. active substance per kilogram soil____ 100
- 50 mg. active substance per kilogram soil_____ 80
- 25 mg. active substance per kilogram soil_____ 50

EXAMPLE 3

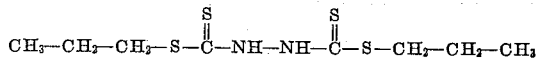

(a) Laboratory tests

| Concentration, percent | Aphelenchoides ritzemalori, percent | Ditylenchus dipreci, percent | Meloidogyne spec., percent |
|---|---|---|---|
| 0.1 | 100 | 100 | 100 |
| 0.01 | 100 | 100 | 95 |
| 0.005 | 100 | 90 | 80 |

(b) Greenhouse tests

Quantity applied: Effect, percent
- 300 mg. active substance per kilogram soil____ 100
- 200 mg. active substance per kilogram soil____ 100
- 100 mg. active substance per kilogram soil____ 90
- 50 mg. active substance per kilogram soil_____ 40
- 25 mg. active substance per kilogram soil_____ 20

EXAMPLE 4

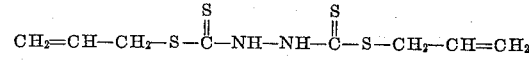

(a) Laboratory tests

| Concentration, percent | Aphelenchoides ritzemalori, percent | Ditylenchus dipreci, percent | Meloidogyne spec., percent |
|---|---|---|---|
| 0.1 | 100 | 100 | 100 |
| 0.01 | 100 | 95 | 90 |
| 0.005 | 100 | 90 | 50 |

(b) Greenhouse tests

Quantity applied: Effect, percent
- 300 mg. active substance per kilogram soil____ 100
- 200 mg. active substance per kilogram soil____ 100
- 100 mg. active substance per kilogram soil____ 80
- 50 mg. active substance per kilogram soil_____ 60

We claim:

1. A process of combating nematodes which comprises treating nematode infected soil with a composition containing as an active ingredient a hydrazino-bis-(dithiocarbonicacidester) of the formula

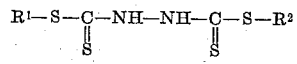

in which $R^1$ and $R^2$ stand for a member selected from the group consisting of lower saturated and unsaturated alkyl radicals, in an effective amount of said active ingredient from about 20 g. to about 250 g. per cubic meter of soil.

2. A nematicidal composition comprising an aqueous emulsion of a hydrazino-bis-(dithiocarbonicacidester) of the formula

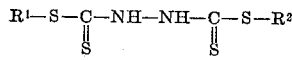

in which $R^1$ and $R^2$ stand for a member selected from the group consisting of lower saturated and unsaturated alkyl radicals.

References Cited in the file of this patent

FOREIGN PATENTS 536,446    Germany _____ Oct. 29, 1931

OTHER REFERENCES

Parnell: British J. Pharmocol. (1952), vol. 7, pp. 509–532 (pp. 509 and 515 pert.).